United States Patent
Risdale (10) Patent No.: US 9,056,593 B2
(45) Date of Patent: Jun. 16, 2015

(54) AIRBAG TETHERING CLIP ASSEMBLY

(75) Inventor: Marc R. Risdale, Dundas (CA)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 14/241,499

(22) PCT Filed: Jun. 15, 2012

(86) PCT No.: PCT/US2012/042592
§ 371 (c)(1),
(2), (4) Date: Feb. 27, 2014

(87) PCT Pub. No.: WO2013/032561
PCT Pub. Date: Mar. 7, 2013

(65) Prior Publication Data
US 2014/0225355 A1    Aug. 14, 2014

Related U.S. Application Data

(60) Provisional application No. 61/528,349, filed on Aug. 29, 2011.

(51) Int. Cl.
*B60R 21/216* (2011.01)
*B60R 21/2338* (2011.01)
(Continued)

(52) U.S. Cl.
CPC ............. *B60R 21/2338* (2013.01); *F16B 5/065* (2013.01); *Y10T 24/307* (2015.01); *B60R 13/0206* (2013.01); *B60R 21/216* (2013.01); *B60R 2021/23386* (2013.01)

(58) Field of Classification Search
CPC ............. B60R 21/216; B60R 21/2338; B60R 2021/23386; B60R 13/0206; F16B 5/065; F16B 5/0233; F16B 21/07; F16B 21/08; Y10T 24/307
USPC ........... 280/728.3, 743.2; 411/39, 40; 24/291, 24/292, 453, 455
See application file for complete search history.

(56) References Cited

U.S. PATENT DOCUMENTS 4,883,382 A * 11/1989 Mushya .................. 411/182
5,211,421 A *  5/1993 Catron et al. .......... 280/728.2
(Continued)

FOREIGN PATENT DOCUMENTS

| DE | 20015848 U1 | 12/2000 |
| JP | 09315253 | 9/1997 |
| JP | 3422299 | 6/2003 |

OTHER PUBLICATIONS

ISR for PCT/US2012/042592 dated Nov. 7, 2012.
(Continued)

*Primary Examiner* — Paul N Dickson
*Assistant Examiner* — Timothy Wilhelm (57) ABSTRACT

A tethering clip assembly is configured to tether first and second panels of a vehicle together. The assembly includes first and second plates, a mechanical fuse connecting the first plate to the second plate in a compressed state, and at least one spring member connected between the first and second plates. The at least one spring member is compressed in the compressed state. The mechanical fuse is configured to break upon exertion of a predetermined force. The at least one spring member extends when the mechanical fuse breaks, thereby forcing the first and second plates to extend away from one another in an extended state.

17 Claims, 7 Drawing Sheets

(51) Int. Cl.
  *F16B 5/06* (2006.01)
  *B60R 13/02* (2006.01)

(56) References Cited

U.S. PATENT DOCUMENTS

| | | |
|---|---|---|
| 6,333,515 B1 | 12/2001 | Kubota |
| 6,394,695 B1 | 5/2002 | Chausset |
| 6,431,585 B1 | 8/2002 | Rickabus |
| 6,565,117 B2 | 5/2003 | Kubota |
| 6,644,886 B2 | 11/2003 | Schwarz |
| 7,147,233 B2 | 12/2006 | Edmond |
| 7,273,227 B2 | 9/2007 | Kawai |
| 7,290,795 B2 * | 11/2007 | Kawai et al. ............... 280/730.2 |
| 7,900,953 B2 * | 3/2011 | Slobodecki et al. ....... 280/728.2 |
| 7,922,135 B2 * | 4/2011 | Granata ...................... 248/206.5 |
| 8,480,120 B1 * | 7/2013 | Fukuda et al. ............. 280/728.2 |
| 2004/0075250 A1 * | 4/2004 | Choi ........................... 280/728.3 |
| 2005/0056449 A1 * | 3/2005 | Roesch et al. .................. 174/58 |
| 2008/0235919 A1 * | 10/2008 | Giddings et al. ................ 24/289 |

OTHER PUBLICATIONS

English translation of JP3422299.
English translation of JP09315253.

* cited by examiner

AIRBAG TETHERING CLIP ASSEMBLY

RELATED APPLICATIONS

This application is a U.S. National Phase if International Application Number PCT/US2012/042592 filed Jun. 15, 2012 and claims priority benefits from U.S. Provisional Patent Application No. 61/528,349 entitled "System and Method for Securing an Airbag to a Frame," filed Aug. 29, 2011, which is hereby incorporated by reference in its entirety.

FIELD OF EMBODIMENTS OF THE INVENTION

Embodiments generally relate to airbags configured for use with automobiles, and, more particularly, to a clip assembly configured to tether an airbag to a frame, pillar, or other such structure within an automobile.

BACKGROUND

Automotive side curtain airbags (SCABs) continue to gain popularity among automobile manufacturers. SCABs are a standard safety feature for an increasing number of automobiles every year. Typically, after an airbag is manufactured, the airbag is rolled up, and then sealed in a sleeve that keeps the airbag properly oriented and positioned until a deployment event.

A variety of sleeve designs are used by major airbag manufacturers. An airbag sleeve is typically formed of plastic or fabric. Velcro, adhesives, or heat-welding are used to close the sleeve around an airbag. When an airbag is deployed, the sleeve tears in order to allow the airbag to inflate and expand.

Conventional airbags may also be rolled up and inserted into a fabric sock. Fabric tabs extend from the rolled bag at various points. Metal stamped parts are then folded over the fabric tabs. The metal stamped parts may then be bolted onto sheet metal, such as that of an automobile frame.

During airbag deployment, structures within the vehicle other than the airbag may eject into the vehicle cabin. For example, a covering panel may be ejected into the cabin as the airbag deploys. In these circumstances, the ejected panels, covers, or the like may cause injury to a driver or passenger.

SUMMARY OF EMBODIMENTS OF THE INVENTION

Certain embodiments provide a tethering clip assembly configured to tether first and second panels of a vehicle together. The assembly may include first and second plates, a mechanical fuse connecting the first plate to the second plate in a compressed state, and at least one spring member connected between the first and second plates. The spring member(s) is compressed in the compressed state. The mechanical fuse is configured to break upon exertion of a predetermined force. The spring member(s) extends when the mechanical fuse breaks, thereby forcing or allowing the first and second plates to extend away from one another in an extended state. The spring member(s) forces the first and second plates away from one another in a linear direction that is parallel to a longitudinal axis of the tethering clip assembly.

The spring member(s) may include two opposed spring members connected to opposite lateral portions of the first and second plates. Each spring member may include a plurality of spring arms connected by curved transitions. Alternatively, the spring member may include a coil spring surrounding the mechanical fuse.

The mechanical fuse may be shaped as a cylinder, hourglass, or block, for example. The assembly may include additional mechanical fuses. The mechanical fuses may be symmetrically spaced about the longitudinal axis.

In an embodiment, the mechanical fuse includes at least one planar beam. In another embodiment, the mechanical fuse includes a clamping mechanical fuse that clamps the first and second plates together in the compressed state. In yet another embodiment, the mechanical fuse includes at least one perforation between the first and second plates.

The first and second plates may be connected to first and second clips, respectively. The first and second clips are configured to secure to the first and second panels, respectively.

Certain embodiments provide an airbag securing system that includes a vehicle frame, a trim panel, an airbag secured between the vehicle frame and the trim panel in a non-deployed state, and a tethering clip assembly configured to tether the trim panel to the vehicle frame. The tethering clip assembly may include first and second plates, a mechanical fuse connecting the first plate to the second plate in the non-deployed state, and at least one spring member connected between the first and second plates. The spring member(s) is compressed in the non-deployed state. The mechanical fuse is configured to break upon deployment of the airbag during a deploying state. The spring member(s) extends when the mechanical fuse breaks, forcing or allowing the first and second plates to extend away from one another in the deploying state.

Certain embodiments provide a tethering clip assembly configured to tether first and second panels of a vehicle together. The tethering clip assembly may include first and second plates, first and second clips extending from outer surfaces of the first and second plates, respectively, wherein the first and second clips are configured to secure to the first and second panels, respectively, a mechanical fuse connected between inner surfaces of the first and second plates in a compressed state, wherein the mechanical fuse is centered about a longitudinal axis of the tethering clip assembly, and spring members connected to the first and second plates. Each of the spring members includes a plurality of spring arms connected by curved transitions. The spring members are compressed in the compressed state. The mechanical fuse is configured to break upon exertion of a predetermined force. The spring members extend when the mechanical fuse breaks, thereby forcing the first and second plates to extend away from one another in a linear direction that is parallel to the longitudinal axis of the tethering clip assembly in an extended state.

The first and second plates, the first and second clips, the mechanical fuse, and the spring members may be integrally molded and formed as a single piece. The single piece may be formed of injection-molded plastic.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE INVENTION

Figure 1:
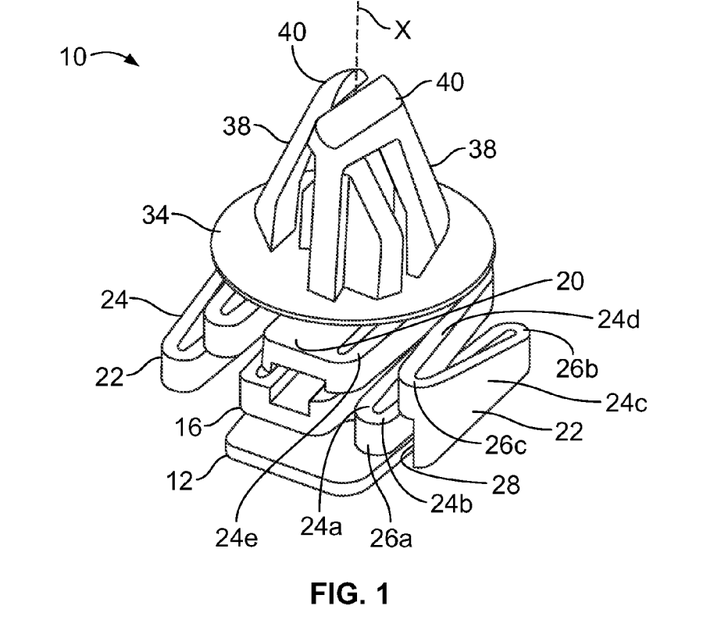
FIG. 1 illustrates an isometric view of a tethering clip assembly, according to an embodiment.
Figure 2:
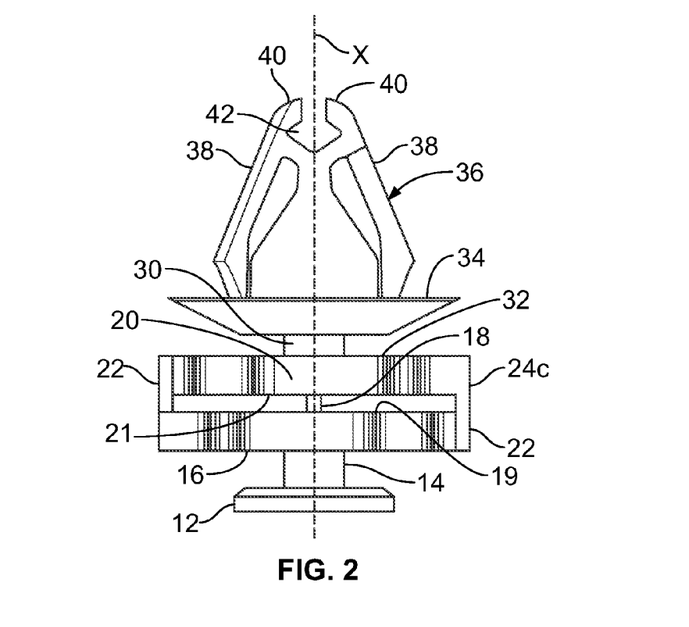
FIG. 2 illustrates a front view of a tethering clip assembly, according to an embodiment.

FIG. 1 illustrates an isometric view of a tethering clip assembly 10, according to an embodiment. FIG. 2 illustrates a front view of the tethering clip assembly 10. Referring to FIGS. 1 and 2, the assembly 10 includes a securing clip 12 connected to a central post 14 that connects to a plate 16. The securing clip 12 may be a planar sheet, panel, beam, plate, or the like, and is configured to secure into a reciprocal opening, channel, hole, or the like, within a trim panel or frame of a vehicle. The central post 14 may be a cylinder, block, or various other shapes and sizes. The plate 16 may be a rigid planar wall, sheet, beam, or the like.

A mechanical fuse 18 extends upwardly from the plate 16 and connects to a plate 20 opposite the plate 16. The mechanical fuse 18 extends between inner surfaces 19 and 21 of the plates 16 and 20. The mechanical fuse 18 may be integrally formed and molded with the plates 16 and 20 as a single piece. For example, the mechanical fuse 18 may be a flashing that is molded with the plates 16 and 20. In general, the assembly 10 may be integrally formed and molded as a single piece of plastic, for example.

The mechanical fuse 18 may be a post, nub, stud, column, or other such protuberance. The mechanical fuse 18 may be generally aligned along the central longitudinal axis x of the assembly 10. As such, the mechanical fuse 18 may be generally symmetrical about the longitudinal axis x. While only one mechanical fuse 18 is shown, more or less mechanical fuses 18 may be used. For example, two or more mechanical fuses 18 may extend between the plates 16 and 20.

Compressed spring members 22 extend between the plates 16 and 20 on opposite sides thereof. The spring members 22 remain compressed due to the mechanical fuse 18 connecting the plates 16 and 20 together. The compressed spring members 22 may be resilient spring members having spring constants that may tend to force the spring members 22 into an uncompressed, extended state. However, the force exerted by the spring members 22 into an uncompressed, extended state may be insufficient to overcome the force exerted by the mechanical fuse 18 connecting the plates 16 and 20 together. That is, the force of the spring members 22 towards an extended state may be insufficient to break the mechanical fuse 18. The potential energy stored in the spring members 22 in the compressed states, as shown in FIGS. 1 and 2, may be insufficient to break the mechanical fuse 18.

As shown in FIG. 1, in particular, each spring member 22 includes a plurality of wound, compressed, spring arms 24. A first spring arm 24a extends laterally from the plate 16 and integrally connects to an outwardly-curved transition 26a, which, in turn, integrally connects to a second spring arm 24b that is outside (that is, outboard, or further away from the central longitudinal axis x of the assembly 10) of the first spring arm 24a. The second spring arm 24b extends toward an outwardly-curved transition 26b, which, in turn, integrally connects to a third spring arm 24c, which is outside of the second spring arm 24b. The third spring arm 24c may include a notch 28 that allows a portion of the third spring arm 24c to seat over a portion of the second spring arm 24b. An end of the third spring arm 24c that is distally located from the outwardly-curved transition 26b integrally connects to an inwardly-curved transition 26c, which, in turn, connects to a fourth spring arm 24d, which is inside (that is, inboard, or closer to the central longitudinal axis x of the assembly 10) of the third spring arm 24c. An end of the fourth spring arm 24d that is distally located from the inwardly-curved transition 26c connects to another inwardly-curved transition (hidden from view), which integrally connects to a fifth spring arm 24e, which integrally connects to a lateral portion of the plate 20.

Both spring members 22 may include an equal number of spring arms, transitions or windings, or the like. The opposed spring members 22 may be inverted with respect to one another, such that spring arms of opposite spring members connect to lateral portions of the panels at opposite ends. Optionally, the spring members 22 may be minor images of one another. Additionally, the spring members 22 may include more or less windings than those shown. For example, each spring member 22 may include two, three, four, five, six, or more windings, transitions, or the like. The spring members 22 may include a particular number of windings in order to provide a desired length of extension. For example, with increased windings or transitions, the longer the length of extension. Additionally, while two spring members 22 are shown, the assembly 10 may include more or less spring members 22. For example, in addition to the spring members 22 shown at sides of the assembly 10, opposed spring members at the front and back of the assembly 10 may also be used. As explained below, when the mechanical fuse 18 breaks, the potential energy stored in the spring members 22 is released as kinetic energy, thereby forcing the assembly 10 to extend in a linear direction that is parallel to the longitudinal axis x of the assembly.

Referring to FIG. 2, in particular, a central post 30 extends from a surface 32 of the plate 20 opposite the mechanical fuse 18. The central post 30, in turn, connects to a flange 34 of a securing clip 36. The securing clip 36 may include opposed prongs 38 having inwardly-angled beveled tips 40 separated by a gap 42. The prongs 38 are configured to snapably secure into a reciprocal hole, opening, channel, or the like of a trim panel or frame of a vehicle.

The securing clips 12 and 36 may be various types of clips used to snapably or otherwise secure the ends of the assembly 10 to panels of a vehicle, for example. For example, both the securing clips 12 and 36 may be sized and shaped as either the clip 12 or 36. Additionally, various other clips, latches, or the like may be used.

The assembly 10 may be formed of an injection-molded plastic, and may be an integral, unitary assembly. The components of the assembly 10 may all be part of a contiguously-formed piece of material. However, the components of the assembly 10 may alternatively be separate and distinct from one another and securely fastened to each other through separate fasteners or fastening agents.

Figure 3:
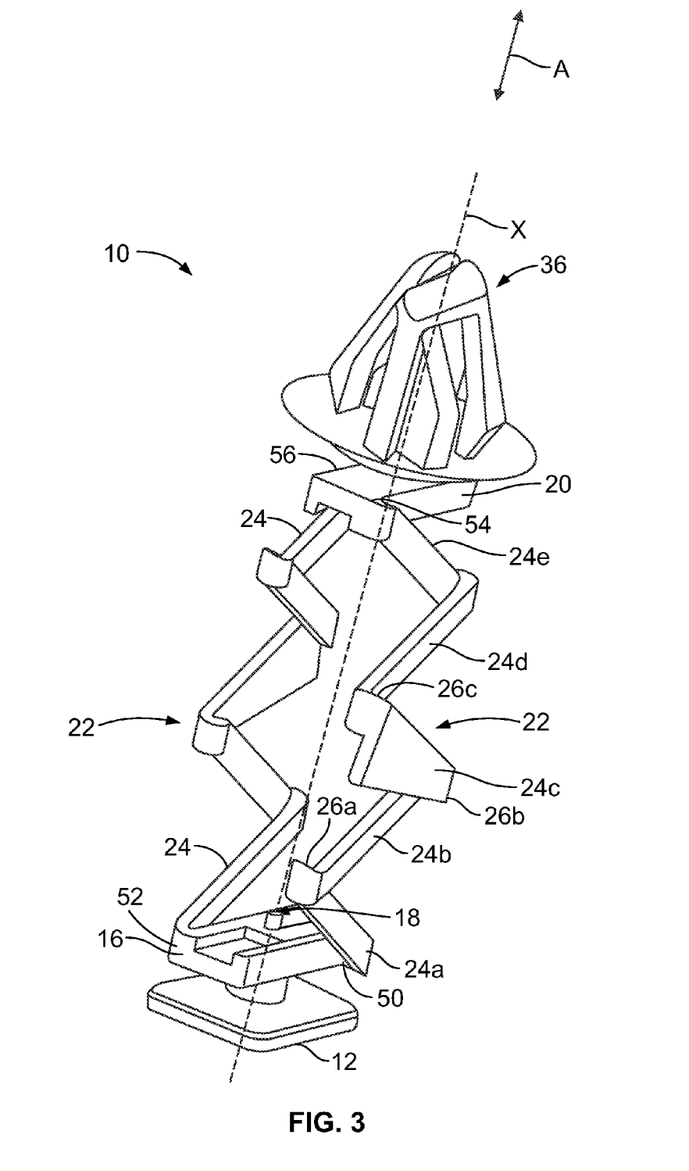
FIG. 3 illustrates an isometric view of a tethering clip assembly in an extended state, according to an embodiment.

FIG. 3 illustrates an isometric view of the tethering clip assembly 10 in an extended state, according to an embodiment. When the mechanical fuse 18 is broken, the stored potential energy of the spring members 22 may be released as kinetic energy, and may force or allow the spring members 22 to extend, uncoil, or otherwise decompress so that the panels 16 and 20 separate from one another in a linear direction A that is parallel with the central longitudinal axis x of the assembly 10. The opposed spring members 22 ensure that the extension of the assembly 10 occurs over a linear direction denoted by arrows A. As shown in FIG. 3, the extension of the assembly 10 may be aligned and centered about the longitudinal axis x of the assembly.

As also shown in FIG. 3, the opposed spring members 22 may be inverted with respect to one another, such that one spring member 22 connects to the panel 16 proximate end 50 and the panel 20 proximate end 54, while the other spring member 22 connects to the panel 16 proximate end 52 and the panel 20 proximate end 56. Again, though, the spring members 22 may alternatively be mirror images of one another such that they connect to the panels 16 and 20 proximate the same ends.

Figure 4:
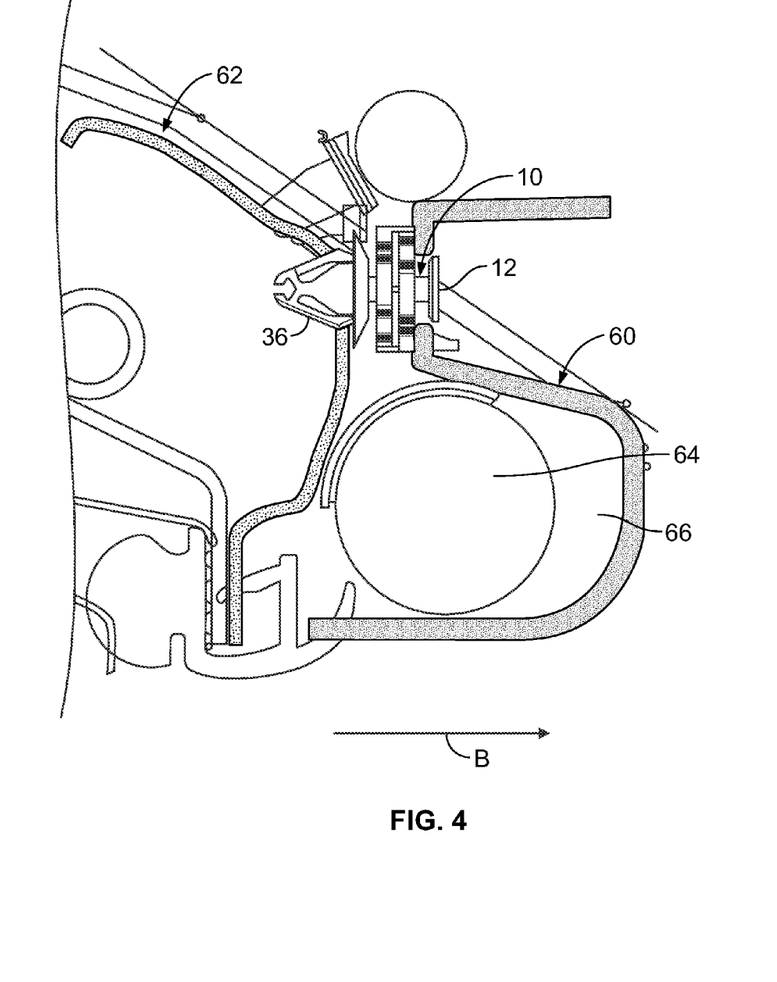
FIG. 4 illustrates an internal view of a tethering clip assembly securing a trim panel to a vehicle frame, according to an embodiment.

FIG. 4 illustrates an internal view of the tethering clip assembly 10 securing a trim panel 60 to a vehicle frame 62, according to an embodiment. The trim panel 60 secures a rolled or folded airbag 64 within an internal chamber 66. As shown in FIG. 4, the folded airbag 64 is in a non-deployed state. The folded airbag 64 is secured between the trim panel 60 and the vehicle frame 62, which may be formed of sheet metal. As shown, the securing clip 36 securely fastens the clip assembly 10 to the vehicle frame 62, while the securing clip 12 securely fastens the clip assembly to the trim panel 60.

In operation, the force exerted into the vehicle through a collision, for example, forces the airbag 64 to deploy. The force of the deploying airbag forces the trim panel 60 to separate from the vehicle frame 62 in the direction of arrow B. As the trim panel 60 separates from the vehicle frame 62, the airbag 64 deploys through the resulting opening between the trim panel 60 and the vehicle frame 62. The clip assembly 10 ensures that the trim panel 60 remains tethered to the vehicle frame 62.

Figure 5:
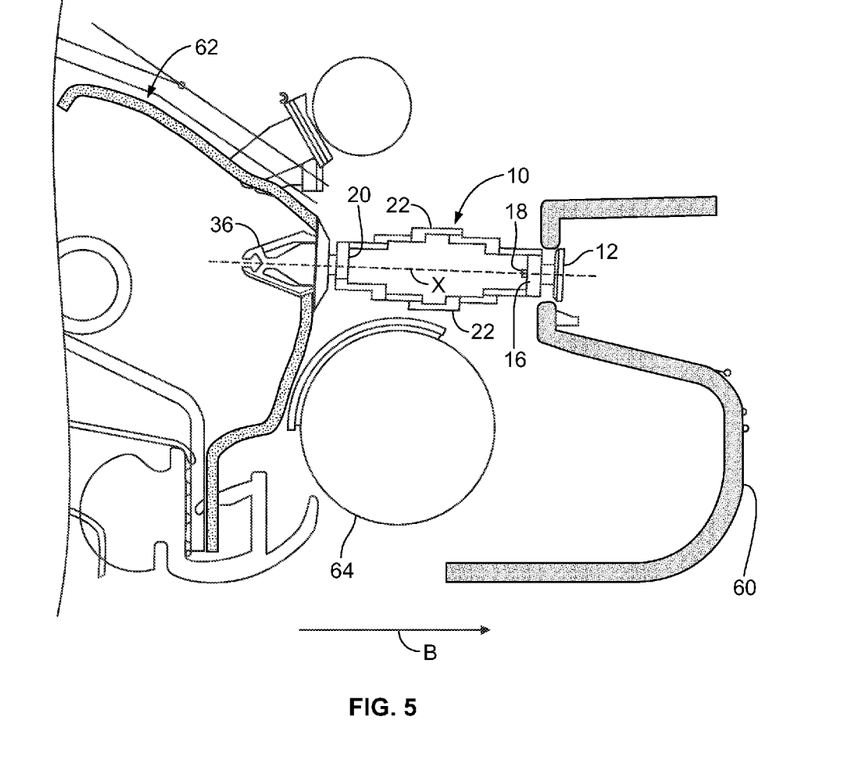
FIG. 5 illustrates an internal view of a tethering clip assembly tethering a trim panel to a vehicle frame during deployment of an airbag, according to an embodiment.

FIG. 5 illustrates an internal view of the tethering clip assembly 10 tethering the trim panel 60 to the vehicle frame 62 during deployment of the airbag 64, according to an embodiment. The force of the deploying airbag 64 is sufficient to break the mechanical fuse 18, which previously maintained the spring members 22 in compressed states. Once the mechanical fuse 18 is broken, the spring members 22 may extend, decompress, or otherwise uncoil into extended states. For example, once the mechanical fuse 18 is broken, stored energy within the compressed spring members 22 may be released, and may cause the spring members 22 to extend, decompress, or otherwise uncoil into extended states. During the extension movement, the assembly 10 extends in a linear direction that is parallel to the longitudinal axis x of the assembly 10. As the spring members 22 extend, the plates 16 and 20 separate from one another. However, the clips 12 and 36 remain securely fastened to the trim panel 60 and the vehicle frame 62, respectively. As such, the trim panel 60, while ejecting away from the vehicle frame 62 in the direction of arrow B, due to the force exerted by the deploying airbag 64, remains securely tethered to the vehicle frame 62. Accordingly, the trim panel 60 is prevented from ejecting into the interior cabin of the vehicle.

As noted above, the mechanical fuse 18 ensures that the spring members 22 remain compressed, and that the plates 16 and 20 are proximate one another, before airbag deployment. The spring constants of the spring members 22 may be insufficient to provide suitable force to break the mechanical fuse 18. However, the mechanical fuse 18 is sized, shaped, and tuned to break upon exertion of a predetermined force. For example, the force of a deploying airbag is sufficient to force the plates 16 and 20 apart, thereby breaking the mechanical fuse 18. The mechanical fuse 18 may be various shapes and sizes, depending on the desired amount of retaining strength between the plates 16 and 20.

The mechanical fuse 18 may be formed based on a desired force-resistive strength to secure the panels of the vehicle together over a desired range of force and extension. The mechanical fuse 18 may be formed to provide a secure, compressed relationship between the plates 16 and 20 up to a desired amount of exerted force. Once the force is exerted, the connection of the mechanical fuse 18 between the plates 16 and 20 is broken, and the plates 16 and 20 spring away from one another.

Figure 6:
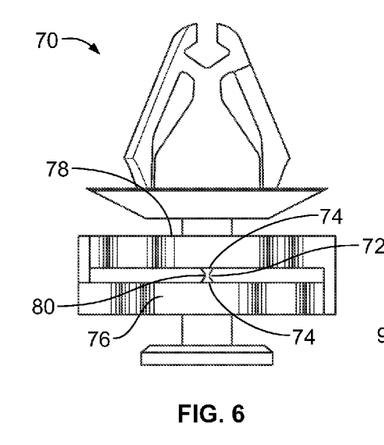
FIG. 6 illustrates a front view of a tethering clip assembly, according to an embodiment.

FIG. 6 illustrates a front view of a tethering clip assembly 70, according to an embodiment. In this embodiment, a mechanical fuse 72 includes expanded connection bases 74 that connect to the plates 76 and 78. The expanded connection bases 74 are integrally connected to one another through a thinned intermediate section 80. As shown in FIG. 6, the mechanical fuse 72 may resemble an hourglass shape. The mechanical fuse 72 may be used in place of the mechanical fuse shown in FIG. 2, for example.

Figure 7:
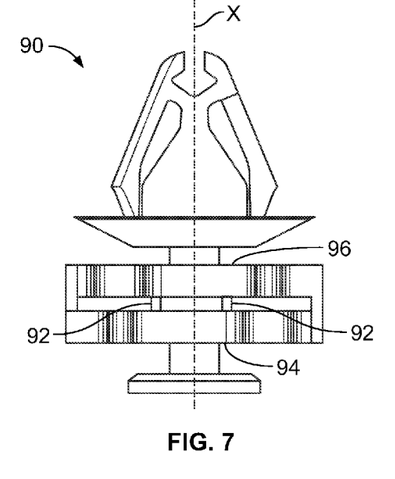
FIG. 7 illustrates a front view of a tethering clip assembly, according to an embodiment.

FIG. 7 illustrates a front view of a tethering clip assembly 90, according to an embodiment. The assembly 90 may include two mechanical fuses 92 centered about a longitudinal axis x of the assembly 90. While two mechanical fuses 92 are shown, additional fuses 92 may be disposed between the plates 94 and 96. Additional mechanical fuses provide increased retaining strength.

Figure 8:
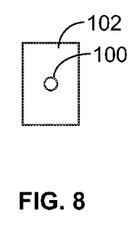
FIG. 8 illustrates an axial cross-sectional view of a mechanical fuse extending from a plate, according to an embodiment.

FIG. 8 illustrates an axial cross-sectional view of a mechanical fuse 100 extending from a plate 102, according to an embodiment. The mechanical fuse 100 may have a circular axial cross-section. As such, the mechanical fuse 100 may be shaped as a cylinder. The mechanical fuse 100 may be used in place of the mechanical fuse(s) shown and described with respect to FIGS. 1-7.

Figure 9:
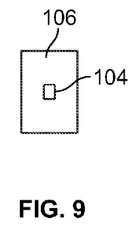
FIG. 9 illustrates an axial cross-sectional view of a mechanical fuse extending from a plate, according to an embodiment.

FIG. 9 illustrates an axial cross-sectional view of a mechanical fuse 104 extending from a plate 106, according to an embodiment. The mechanical fuse 104 may have a square or rectangular axial cross-section. The mechanical fuse 104 may be used in place of the mechanical fuse(s) shown and described with respect to FIGS. 1-7.

Figure 10:
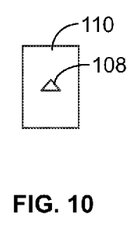
FIG. 10 illustrates an axial cross-sectional view of a mechanical fuse extending from a plate, according to an embodiment.

FIG. 10 illustrates an axial cross-sectional view of a mechanical fuse 108 extending from a plate 110, according to an embodiment. The mechanical fuse 108 may have a triangular axial cross-section. The mechanical fuse 108 may be used in place of the mechanical fuse(s) shown and described with respect to FIGS. 1-7.

Figure 11:
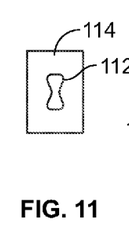
FIG. 11 illustrates an axial cross-sectional view of a mechanical fuse extending from a plate, according to an embodiment.

FIG. 11 illustrates an axial cross-sectional view of a mechanical fuse 112 extending from a plate 114, according to an embodiment. The mechanical fuse 112 may have a bone-shaped axial cross-section. The mechanical fuse 112 may be used in place of the mechanical fuse(s) shown and described with respect to FIGS. 1-7.

Overall, the mechanical fuse may have any type of shape, depending on preferences, desired strength, and other design considerations.

Figure 12:
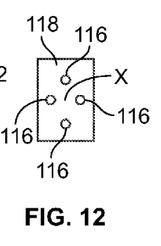
FIG. 12 illustrates an axial cross-sectional view of mechanical fuses extending from a plate, according to an embodiment.

FIG. 12 illustrates an axial cross-sectional view of mechanical fuses 116 extending from a plate 118, according to an embodiment. As shown in FIG. 12, four mechanical fuses 116 are evenly spaced about a central axis x of the plate 118. The mechanical fuses 116 may form a symmetrical pattern with respect to the central axis x. The mechanical fuses 116 may be shaped as any of the mechanical fuses discussed above.

Figure 13:
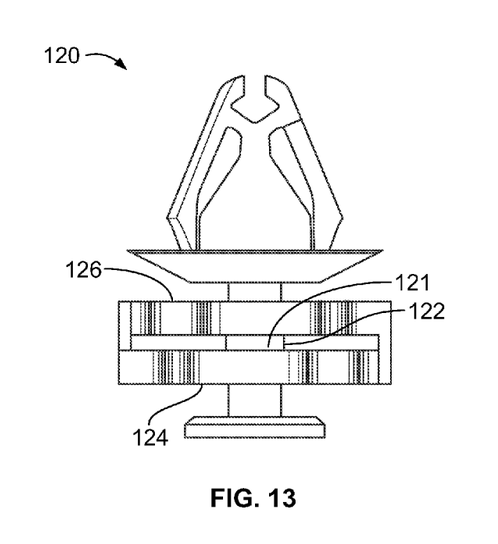
FIG. 13 illustrates a front view of a tethering clip assembly, according to an embodiment.

FIG. 13 illustrates a front view of a tethering clip assembly 120, according to an embodiment. In this embodiment, a mechanical fuse 121 may be a central planar strap or beam 122 that connects the plates 124 and 126 together. The beam 122 may span the entire length or width of the plates 124 and 126. Optionally, the beam 122 may span less the entire length or width of the plates 124 and 126. Use of the beam 122, as opposed to a central post, may provide a mechanical fuse 121 with increased retaining strength between the plates 124 and 126. The mechanical fuse 121 may be used in place of the mechanical fuse(s) shown and described with respect to FIGS. 1-7.

Figure 14:
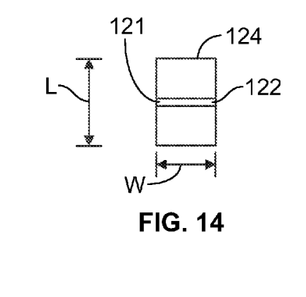
FIG. 14 illustrates an axial cross-sectional view of a mechanical fuse extending from a plate, according to an embodiment.

FIG. 14 illustrates an axial cross-sectional view of the mechanical fuse 121 extending from the plate 124, according to an embodiment. As shown, the planar beam 122 extends over a width W of the plate 124. Optionally, the planar beam 122 may extend over a length L of the plate 124.

Figure 15:
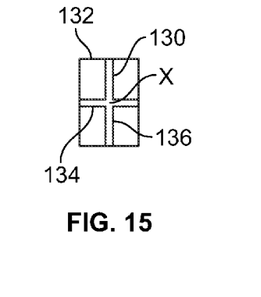
FIG. 15 illustrates an axial cross-sectional view of a mechanical fuse extending from a plate, according to an embodiment.

FIG. 15 illustrates an axial cross-sectional view of a mechanical fuse 130 extending from a plate 132, according to an embodiment. The mechanical fuse 130 may include intersecting planar beams 134 and 136 that intersect at a center x of the plate 132. The beam 134 may extend over a width of the plate 132, while the beam 136 may extend over a length of the plate 132. The intersecting beams 134 and 136 may provide the mechanical fuse 130 with increased retaining strength between opposed plates. Additionally, more intersecting beams may be used. The mechanical fuse 130 may be used in place of the mechanical fuse(s) shown and described with respect to FIGS. 1-7.

Figure 16:
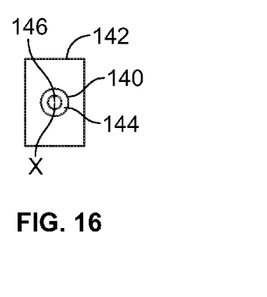
FIG. 16 illustrates an axial cross-sectional view of a mechanical fuse extending from a plate, according to an embodiment.

FIG. 16 illustrates an axial cross-sectional view of a mechanical fuse 140 extending from a plate 142, according to an embodiment. The mechanical fuse 140 may include a cylindrical outer wall 144 defining an interior space 146. The cylindrical outer wall 144 may be centered about a center x of the plate 142. The mechanical fuse 140 may be used in place of the mechanical fuse(s) shown and described with respect to FIGS. 1-7.

Alternatively, the mechanical fuse may be a perforated connection wall between the plates. Further, instead of discernible plates, the assembly may include a block having a perforated intermediate section that serves as the mechanical fuse.

Figure 17:
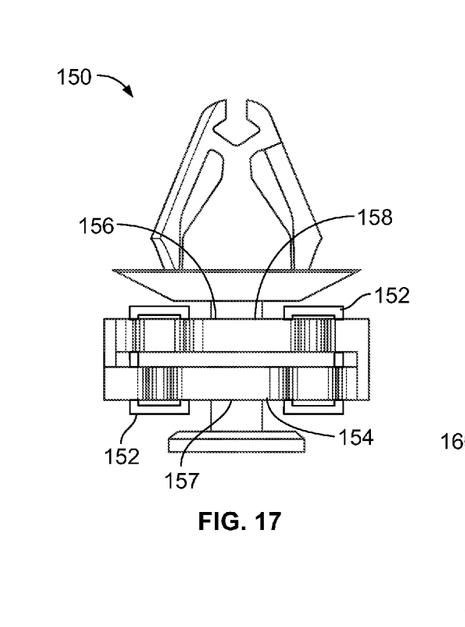
FIG. 17 illustrates a front view of a tethering clip assembly, according to an embodiment.

FIG. 17 illustrates a front view of a tethering clip assembly 150, according to an embodiment. The assembly 150 includes clamping mechanical fuses 152 that connect the plates 154 and 156 together. The clamping mechanical fuses 152 connect to outer surfaces 157 and 158 of the plates 154 and 156, respectively. The mechanical fuses 152 may be integrally formed and molded with the assembly 150. More or less mechanical fuses 152 may be used with the assembly 150. The mechanical fuse 152 may be used in place of the mechanical fuse(s) shown and described with respect to FIGS. 1-7.

Figure 18:
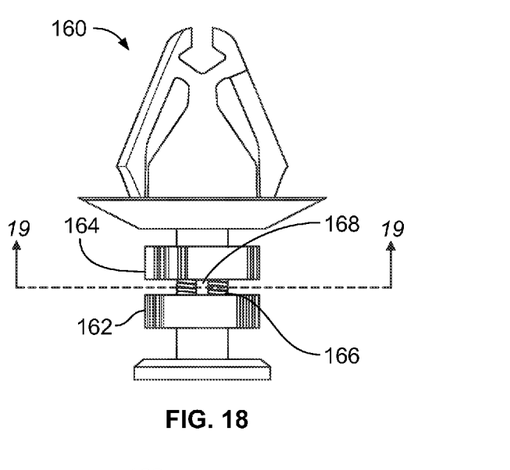
FIG. 18 illustrates a front view of a tethering clip assembly, according to an embodiment.

FIG. 18 illustrates a front view of a tethering clip assembly 160, according to an embodiment. In this embodiment, instead of opposed spring members on lateral portions of the plates 162 and 164, the spring member 166 may be a coil spring that surrounds a central mechanical fuse 168, such as any of the fuses described above.

Figure 19:
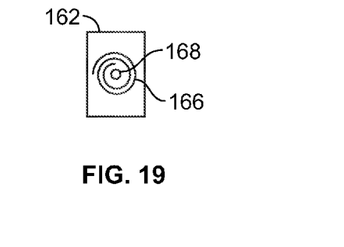
FIG. 19 illustrates an axial cross-sectional view of a tethering clip assembly, through line 19-19 of FIG. 18, according to an embodiment.

FIG. 19 illustrates an axial cross-sectional view of the tethering clip assembly 160, through line 19-19 of FIG. 18. As shown, the spring member 166 is a coil spring that surrounds the mechanical fuse 168. Referring to FIGS. 18 and 19, the coil spring may be formed of plastic, and may be integrally formed and molded with the assembly 160. Optionally, the coil spring may be separate and distinct from the assembly 160. The coil spring may be a metal coil spring.

Embodiments provide a tethering clip assembly that ensures that a panel of a vehicle, such as a trim panel, remains tethered to a vehicle frame during deployment of an airbag. As such, the trim panel is prevented from ejecting into an interior cabin of the vehicle, thereby eliminating or otherwise minimizing the risk of injury to individuals within the interior cabin.

Embodiments provide a system and method of securely tethering an airbag within a vehicle. The assembly allows the airbag to deploy when a force of a certain magnitude is exerted into, on, or within the vehicle, but, at the same, ensures that securing panels within the vehicle remain tethered to one another.

While various spatial and directional terms, such as top, bottom, lower, mid, lateral, horizontal, vertical, front and the like may be used to describe embodiments of the present invention, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present invention. It is understood that the embodiments disclosed and defined herein extend to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

The invention claimed is:

1. A tethering clip assembly configured to tether first and second panels of a vehicle together, the tethering assembly comprising:
   first and second plates;
   a mechanical fuse connecting the first plate to the second plate; and
   at least one member connected between the first and second plates, wherein the mechanical fuse is configured to break upon exertion of a predetermined force, and wherein the at least one member extends when the mechanical fuse breaks, causing the first and second plates to extend away from one another in a linear direction that is parallel to a longitudinal axis of the tethering clip assembly in an extended state.

2. The tethering clip assembly of claim 1, wherein the mechanical fuse is shaped as one of a cylinder, hourglass, or block.

3. The tethering clip assembly of claim 1, wherein the mechanical fuse comprises at least one planar beam.

4. The latching clip assembly of claim 1, wherein the mechanical fuse comprises at least one perforation between the first and second plates.

5. The latching clip assembly of claim 1, wherein the first and second plates are connected to first and second clips, respectively, and wherein the first and second clips are configured to secure to the first and second panels, respectively.

6. A tethering clip assembly configured to tether first and second panels of a vehicle together, the tethering assembly comprising:
   first and second plates;
   first and second clips extending from outer surfaces of the first and second plates, respectively, wherein the first and second clips are configured to secure to the first and second panels, respectively;
   a mechanical fuse connected between inner surfaces of the first and second plates, wherein the mechanical fuse is centered about a longitudinal axis of the tethering clip assembly; and
   members connected to the first and second plates, wherein the mechanical fuse is configured to break upon exertion of a predetermined force, and wherein the members extend when the mechanical fuse breaks, causing the first and second plates to extend away from one another in a linear direction that is parallel to the longitudinal axis of the tethering clip assembly in an extended state.

7. The tethering clip assembly of claim 6, wherein the first and second plates, the first and second clips, the mechanical fuse, and the members are integrally molded and formed as a single piece.

8. The tethering clip assembly of claim 7, wherein the single piece is formed of injection-molded plastic.

9. A tethering clip assembly configured to tether first and second panels of a vehicle together, the tethering assembly comprising:
   first and second plates;
   a mechanical fuse connecting the first plate to the second plate; and
   at least one member connected between the first and second plates, wherein the mechanical fuse is configured to break upon exertion of a predetermined force, and wherein the at least one member extends when the mechanical fuse breaks, causing the first and second plates to extend away from one another in an extended state, wherein the at least one member comprises two opposed spring members connected to opposite lateral portions of the first and second plates.

10. A tethering clip assembly configured to tether first and second panels of a vehicle together, the tethering assembly comprising:
    first and second plates;
    a mechanical fuse connecting the first plate to the second plate; and
    at least one member connected between the first and second plates, wherein the mechanical fuse is configured to break upon exertion of a predetermined force, and wherein the at least one member extends when the mechanical fuse breaks, causing the first and second plates to extend away from one another in an extended state, wherein the at least one member comprises a plurality of spring arms connected by curved transitions.

11. A tethering clip assembly configured to tether first and second panels of a vehicle together, the tethering assembly comprising:
    first and second plates;
    a mechanical fuse connecting the first plate to the second plate; and
    at least one member connected between the first and second plates, wherein the mechanical fuse is configured to break upon exertion of a predetermined force, and wherein the at least one member extends when the mechanical fuse breaks, causing the first and second plates to extend away from one another in an extended state, wherein the at least one member comprises a coil spring surrounding the mechanical fuse.

12. A tethering clip assembly configured to tether first and second panels of a vehicle together, the tethering assembly comprising:
    first and second plates;
    a mechanical fuse connecting the first plate to the second plate;
    at least one member connected between the first and second plates, wherein the mechanical fuse is configured to break upon exertion of a predetermined force, and wherein the at least one member extends when the mechanical fuse breaks, causing the first and second plates to extend away from one another in an extended state;
    additional mechanical fuses, wherein the mechanical fuse and the additional mechanical fuses are symmetrically spaced about the longitudinal axis of the tethering clip assembly.

13. A tethering clip assembly configured to tether first and second panels of a vehicle together, the tethering assembly comprising:
    first and second plates;
    a mechanical fuse connecting the first plate to the second plate; and
    at least one member connected between the first and second plates, wherein the mechanical fuse is configured to break upon exertion of a predetermined force, and wherein the at least one member extends when the mechanical fuse breaks, causing the first and second plates to extend away from one another in an extended state, wherein the mechanical fuse comprises a clamping mechanical fuse that clamps the first and second plates together in a compressed state.

14. An airbag securing system, comprising:
a vehicle frame;
a trim panel;
an airbag secured between the vehicle frame and the trim panel in a non-deployed state; and
a tethering clip assembly configured to tether the trim panel to the vehicle frame, the tethering assembly comprising:
first and second plates;
a mechanical fuse connecting the first plate to the second plate in the non-deployed state; and
at least one member connected between the first and second plates, wherein the mechanical fuse is configured to break upon deployment of the airbag during a deploying state, and wherein the at least one member extends when the mechanical fuse breaks, causing the first and second plates to extend away from one another in a linear direction that is parallel to a longitudinal axis of the tethering clip assembly in the deploying state.

15. The system of claim 14, wherein the first and second plates are connected to first and second clips, respectively, and wherein the first and second clips are configured to secure to the first and second panels, respectively.

16. An airbag securing system, comprising:
a vehicle frame;
a trim panel;
an airbag secured between the vehicle frame and the trim panel in a non-deployed state; and
a tethering clip assembly configured to tether the trim panel to the vehicle frame, the tethering assembly comprising:
first and second plates;
a mechanical fuse connecting the first plate to the second plate in the non-deployed state; and
at least one member connected between the first and second plates, wherein the mechanical fuse is configured to break upon deployment of the airbag during a deploying state, and wherein the at least one member extends when the mechanical fuse breaks, causing the first and second plates to extend away from one another in the deploying state, wherein the at least one member comprises two opposed spring members connected to opposite lateral portions of the first and second plates.

17. An airbag securing system, comprising:
a vehicle frame;
a trim panel;
an airbag secured between the vehicle frame and the trim panel in a non-deployed state; and
a tethering clip assembly configured to tether the trim panel to the vehicle frame, the tethering assembly comprising:
first and second plates;
a mechanical fuse connecting the first plate to the second plate in the non-deployed state; and
at least one member connected between the first and second plates, wherein the mechanical fuse is configured to break upon deployment of the airbag during a deploying state, and wherein the at least one member extends when the mechanical fuse breaks, causing the first and second plates to extend away from one another in the deploying state, wherein the at least one member comprises a plurality of spring arms connected by curved transitions.

* * * * *